Patented Sept. 29, 1953

2,653,901

UNITED STATES PATENT OFFICE 2,653,901

ADENYLIC ACID SALTS-GELATIN COMPOSITION

Edward K. Harvill, Essex, Conn., assignor to Ernst Bischoff Company, Inc., Ivoryton, Conn., a corporation of Connecticut No Drawing. Application September 16, 1952, Serial No. 309,954

18 Claims. (Cl. 167—82.9)

This invention relates to a therapeutic composition for administration to humans and which has a prolonged therapeutic action in the body, comprising an alkali metal salt of adenylic acid, and more particularly to a therapeutic composition comprising an alkali metal salt of adenylic acid dissolved in an aqueous, slowly absorbable menstruum comprising gelatine.

In patent application Serial No. 98,406, filed June 10, 1949, of which this application is a continuation-in-part, there have been described aqueous solutions of alkali metal salts of adenylic acid having a pH within the range of 5.55 to 7. These solutions contain a mixture of the mono- and disodium salts of adenylic acid, the proportion of each salt depending upon the pH of the solution, but the proportion of monosodium salt generally being the greater. In contrast to aqueous solutions of adenylic acid, which are known to be unstable, these solutions are quite stable, and this stability is attributed to their having a pH above 5.55, at which the acid exists as the salt. These solutions are suitable for intramuscular injection in the treatment of many ailments, particularly in the treatment of pruritis.

The so-called adenylic acid system includes a series of rather complicated compounds which are combinations of the base adenine (6-amino purine), the pentose d-ribose, and phosphoric acid, among others. The combination of adeninie with ribose linked in glycosidic union at the 9-position of the base constitutes the substance known as adenosine, which has the following formula:

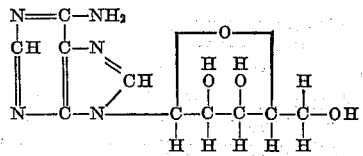

The monophosphoric derivative of adenosine (adenosine-5-monophosphoric acid) is designated herein as adenylic acid. It has the following formula:

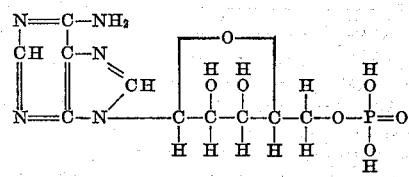

It may be prepared from yeast or muscle and for the purpose of describing this invention, the adenylic acid referred to is that of the above formula irrespective of its origin, Adenylic acid is one of three related coenzyme-active substances constituting the adenylic acid system, and the other members are more highly phosphorylated derivatives, namely the di- and triphosphoric acid compounds. For example, adenosine triphosphoric acid (or adenosine pyrophosphoric acid or adenylpyrophosphoric acid, as it is sometimes termed) has been assigned the following formula:

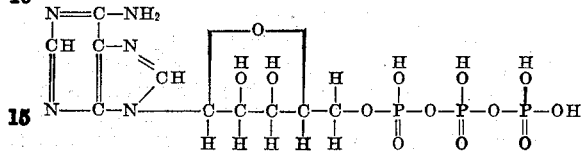

Some references give other formulas, but the above formula represents the best current information on the structure of the compound.

The adenylic acid system in the body appears to constitute a mobile equilibrium which functions as a carrier for phosphoric acid, and is essential to carbohydrate metabolism. The lower phosphate esters of adenosine act as phosphoric acid acceptors, and the more highly phosphorylated derivatives act as donators of the acid.

It is known that muscle contains adenosine triphosphoric acid. Adenylic acid as such is not contained in animal tissue. The alkali metal salts of adenosine triphosphoric acid have been proposed for therapeutical purposes (U. S. Patent No. 1,978,881), and adenylic acid as such, both from yeast and muscle sources has been prepared, as well as adenosine triphosphoric acid and the alkali metal salts of the latter as referred to above.

When aqueous solutions of alkali metal salts of adenylic acid are administered they are utilized in a slow and steady way, and therefore are capable of giving a more sustained effect than is possible with the administration of adenosine triphosphoric acid. A normal dose is 20 mg./hour for five hours, repeated on three successive days, and this has given excellent results in most cases. Not all of the adenylic acid is utilized, but these amounts should be administered to maintain the adenosine triphosphoric acid level over a long enough time to aid the patient. However, in some refractory cases these injections are at too frequent intervals, and the patient's limit of tolerance of injections may quickly be reached and the treatments have to be halted short of completion. It would be desirable in such cases to administer a composition which is capable of providing a more prolonged action of adenylic acid in the body, so that for instance one daily 20 mg.

injection would give as enduring an effect as several 20 mg. injections of the aqueous adenylic acid solution, and the treatment could be continued over a greater number of days to achieve a more enduring effect.

Solid gelatine solutions of therapeutic agents have been employed heretofore for administration to humans to prolong the action of the therapeutic agent after administration. Such preparations usually contain a sugar such as dextrose to add body and make the preparation more isotonic. They are solid at body temperature but can be liquefied by heating in warm water and then administered intramuscularly by injection. It is assumed they solidify again in the body. The gelatine acts to retard absorption of the agent and thus prolongs the duration of its effectiveness. Gelatine-dextrose solutions of alkali metal salts of adenylic acid have, however, proved difficult to prepare. For instance, gelatine-dextrose solutions of sodium adenylate which have a pH within the range from 5.55 to about 7, i. e., the pH within the range disclosed in the prior application Serial No. 98,406, show a strong tendency to darken upon sterilization. In some instances, such solutions have turned black and of course this renders them useless. Moreover, solid gelatine-dextrose solutions of sodium adenylate whose pH is above about 6.5 do not appear to be liquefiable when warmed.

In accordance with the instant invention, a gelatine solution of a sodium salt of adenylic acid is provided having a pH within the range from 5 to 5.5. Many of these solutions can be prepared which are solid at body temperatures, i. e., up to 100° F., but liquefy when warmed to higher temperatures, and therefore are suited for intramuscular injection. It is surprising to note that these solutions do not darken upon sterilization even when they contain a sugar such as dextrose and are remarkably stable. Their therapeutic activity does not deteriorate following long periods of storage. This latter property is particularly surprising since, at a pH within this range, the solution undoubtedly is a mixture of adenylic acid and the monosodium salt of adenylic acid, the pH of a pure solution of monosodium salt being 5.55, and adenylic acid is known to be unstable in aqueous solution. Evidently at this pH range gelatine has a stabilizing effect upon the adenylic acid, and whatever reaction causes the darkening is inhibited.

The gelatine should be of a high grade of purity, and preferably is free from objectionable odor, bacteria, and injurious foreign substances such as arsenic, copper, zinc and sulfur dioxide. The edible or food grade gelatines can be used. The sodium salts of adenylic acid are preferred, but any alkali metal salt of adenylic acid can be used, such as the potassium salt.

The therapeutic composition of the invention is readily prepared by blending an aqueous solution of an alkali metal salt of adenylic acid, or of adenylic acid dissolved with the aid of an alkali, with an aqueous solution comprising gelatine. If adenylic acid is the starting material, the adenylic acid is dissolved in water, adding sufficient alkali to produce a clear solution but not to produce a solution having a pH higher than about 6.5. Alkali metal salts of adenylic acid are dissolved in water and the pH adjusted to 6.5 or below if necessary. This solution is blended with an aqueous gelatine solution. Gelatine is normally slightly acidic and the pH of the gelatine-dextrose solution before blending with the adenylic acid solution may be as low as 4.5. Therefore the pH of the resulting solution will be lower than the starting adenylic acid solution, and, in most instances, will be within the range from 5 to 5.5. The resulting solution is solid at normal body temperatures but can be liquefied upon warming above these temperatures. Thus the solution is readily administered as the liquid, and it is assumed that when it cools again in the body, it solidifies, and that in this way the absorption of the adenylic acid is retarded and the therapeutic action of the composition prolonged.

The concentrations of adenylic acid and gelatine, the only essential ingredients of the composition, are not critical.

The amount of adenylic acid is sufficient to give a therapeutic effect, and a concentration of 10 mg. per cc. is usually adequate. A saturated solution could be used, but normally not more than 200 mg. per cc. would be present. Dilute solutions, i. e., of 10 to 50 mg. per cc., are preferred. Concentrations for convenience are based on the acid, although this would be present in part at least as the salt.

The amount of gelatine is enough to render the solution solid at temperatures below about 100° F., i. e., normal body temperatures and below. If the composition is intended for injection intramuscularly or subcutaneously, it should be readily liquefiable by warming to temperatures of at least 100° F., and therefore the amount of gelatine should not be so high as to prevent liquefication of the solution at temperatures above 100° F. Preferably, the solution will liquefy at from 100 to 150° F. The composition should not liquefy at so high a temperature that its administration as a liquid will cause pain. From 8 to 20% gelatine is enough to meet these requirements, about 180 mg. per cc. being preferred for a solution containing 20 mg. per cc. of adenylic acid. If the composition is to be administered perorally or sublingually in tablet form its liquefying temperature is unimportant.

In the event that the solution obtained after mixing the adenylic acid and gelatine solutions does not have a pH within the required range, an edible water-soluble organic acid or acid salt thereof can be added in an amount to bring the pH to within the range of 5 to 5.5. Satisfactory for this purpose are organic acids selected from the group consisting of polycarboxylic aliphatic acids and hydroxy aliphatic acids, of which citric, lactic, malic, malonic, succinic, glutaconic, adipic, glutaric, gluconic, mucic, and tartaric acids are exemplary. The acids can be used in the form of their acid salts if such salts are sufficiently acidic. Acids and acid salts having an ionization constant $K_{ion}$ greater than $1 \times 10^{-4}$ are preferred. Only a very small amount of acid usually is required, less than 0.1% being sufficient for adenylic acid solutions containing up to 200 mg. adenylic acid per cc.

In order to impart body to the solution and make it more isotonic, a sugar can be incorporated in the composition. Any edible nontoxic sugar can be employed, and such sugars are well known to those skilled in this art. Dextrose is preferred. Any amount of sugar will increase the body and isotonicity of the composition and the amount is therefore not critical, but enough would be used to give the desired effect. Usually from 5% to 15% sugar is employed. Although a sugar is not essential, the preferred composition of the invention contains a sugar, preferably dextrose, for imparting optimum properties to the composition.

An antiseptic agent can also be included, usually in an amount not exceeding one percent. Phenol is typical, but those skilled in the art are aware of other antiseptics which can be used in therapeutic compositions and any of these can be employed in the composition of the invention.

The composition can be sterilized under usual and customary conditions as is well known to those skilled in the art.

The following examples are given to illustrate the invention:

*Example I*

Adenylic acid (260 grams) was suspended in 1 liter of water and sufficient sodium hydroxide added to dissolve the adenylic acid while keeping the pH at about 6.5.

Dextrose (1040 grams) was dissolved in 3 liters of water and this solution added to 2340 grams of gelatine which has previously been wetted with a portion of the dextrose solution. 3 liters of water were added and the mixture warmed until the gelatine had dissolved. The aqueous sodium adenylate solution then was blended with the gelatine solution, and sufficient water added to bring the total volume to 12.6 liters.

Citric acid (0.1% based on the 13 liter final volume of the solution) was added to adjust the pH to about 5.2 and the solution brought to a total final volume of 13 liters by the addition of more water. Phenol was added to 0.5% by weight of the final solution. The resulting solution contained 20 mg. per cc. of adenylic acid, largely as sodium adenylate, and 180 mg. per cc, of gelatine. The solution was a solid at temperatures below 100° F., melting at 100° F. to produce a clear liquid which was readily injectable intramuscularly.

In the treatment of pruritis, 1 cc. of this composition when injected intramuscularly daily for three days and 1 cc. every other day for three more days was found capable of increasing the level of adenosine-5-triphosphoric acid in the blood and maintaining this increased level sufficiently to produce a good pattern of response. An aqueous solution of sodium adenylates (20 mg. per cc.) having a pH of about 7 but not containing gelatine was capable of maintaining an increased level of adenosine triphosphoric acid and producing a similar pattern of response for the same period only if injected in 1 cc. doses every hour for five hours, repeated daily for three days. This shows that the composition of the invention is capable of considerably prolonging the effect of the adenylic acid on the level of adenosine-5-triphosphoric acid in the blood.

*Example II*

A composition was prepared as set forth in Example I, having a pH of about 6.3 before addition of the gelatine solution. In this case, however, the acidity of the composition obtained was such that no addition of citric acid was required, the solution having a pH of 5.2 after mixing.

This solution had properties similar to the solution of Example I.

*Example III*

A solution was prepared as set forth in Example I using gluconic acid instead of citric acid. The solution had properties similar to those of Example I.

The therapeutic compositions of the invention are suitable for administration to humans in cases where the blood analysis indicates an insufficient amount of nucleic phosphorus compounds, particularly adenosine-5-triphosphoric acid. Notable results have been obtained in the treatment of pruritis due to Hodgkin's and other diseases. Complete subsidence or marked amelioration of symptoms was obtained in the majority of cases treated. These findings were obtained in generalized pruritis, pruritis ani, pruritis vulvae, pruritis scroti, idiopathic pruritis and contact dermatitis. The composition has also been useful in treating varicose veins, angina pectoris, avitaminosis, arthritis and intermittent claudication. I have also observed that adenosine-5-monophosphate markedly depresses the serum cholesterol levels in men, as reported in the "Federation Proceedings" (published by the Federation of American Societies for Experimental Biology), volume 11, No. 1, Part I, p. 487 (March, 1952).

In the treatment of pruritis, dermatitis and ulceration accompanying varisose veins 1 ampule (1 cc.) 20 mg. per cc. of adenylic acid a day can be administered intramuscularly for three successive days. Thereafter injections of 1 cc. every second day can be continued until the response is satisfactory. The exact dosage, of course, varies with the needs of the individual and these amounts can be varied considerably. However, because of the prolonged therapeutic action of the composition of the invention, it is not necessary to repeat dosages at as frequent intervals as in the case of solutions described in the prior application, Serial No. 98,406. It may be noted that the therapeutic effect in the cases of the solutions of the prior application and the solutions of the instant invention is the same. The only difference lies in the prolonged action of the composition of the instant invention.

All percentages in the specification are by weight of the solution.

I claim:

1. A therapeutic composition to provide a prolonged therapeutic action in the body comprising an alkali metal salt of adenylic acid dissolved in an aqueous, slowly absorbable menstruum comprising gelatine and having a pH within the range from 5 to 5.5, said menstruum being solid at normal body temperatures.

2. A therapeutic composition in accordance with claim 1 in which the alkali metal salt is the sodium salt.

3. A therapeutic composition to provide a prolonged therapeutic action in the body comprising an alkali metal salt of adenylic acid dissolved in an aqueous, slowly absorbable menstruum comprising gelatine and containing an organic acid selected from the group consisting of polycarboxylic aliphatic acids and hydroxy aliphatic acids in an amount to adjust the pH to within the range from 5 to 5.5, said menstruum being solid at normal body temperatures.

4. A therapeutic composition in accordance with claim 3 in which the organic acid is citric acid.

5. A therapeutic composition in accordance with claim 3 in which the organic acid is gluconic acid.

6. A therapeutic composition in accordance with claim 3 in which the alkali metal salt is the sodium salt.

7. A therapeutic composition to provide a prolonged therapeutic action in the body comprising an alkali metal salt of adenylic acid dissolved in an aqueous, slowly absorbable menstruum comprising gelatine and a sugar and having a pH within the range of 5 to 5.5, said menstruum being solid at normal body temperatures.

8. A therapeutic composition in accordance with claim 7 in which the sugar is dextrose.

9. A therapeutic composition to provide a prolonged therapeutic action in the body comprising a sodium salt of adenylic acid dissolved in an aqueous, slowly absorbable menstruum comprising gelatine and citric acid in an amount to adjust the pH to about 5.2, said menstruum being solid at normal body temperatures.

10. A therapeutic composition to provide a prolonged therapeutic action in the body comprising a mixture of adenylic acid and a mono-alkali metal salt of adenylic acid dissolved in an aqueous, slowly absorbable menstruum comprising gelatine and having a pH within the range from 5 to 5.5, said menstruum being solid at normal body temperatures.

11. A therapeutic composition in accordance with claim 10 in which the alkali metal salt is the sodium salt.

12. A process for preparing a therapeutic composition for administration to humans to provide a prolonged therapeutic action in the body which comprises blending an aqueous solution of an alkali metal salt of adenylic acid having a pH not higher than about 6.5 with an aqueous solution of gelatine and adjusting the pH, if necessary, to within the range from about 5 to 5.5 by addition of an organic acid selected from the group consisting of polycarboxylic aliphatic and hydroxy aliphatic acids, the gelatine being present in an amount to produce a composition solid at normal body temperatures.

13. A process in accordance with claim 12 in which the acid is citric acid.

14. A process in accordance with claim 12 in which the acid is gluconic acid.

15. A process in accordance with claim 12 in which the alkali is sodium hydroxide.

16. A process for preparing a therapeutic composition to provide a prolonged therapeutic action in the body which comprises dissolving adenylic acid in water with the aid of an alkali to adjust the pH of the solutiton to not higher than about 6.5, blending the said solution with an aqueous solution comprising gelatine and a sugar and adjusting the pH, if necessary, to within the range from about 5 to 5.5 by addition of an organic acid selected from the group consisting of polycarboxylic aliphatic and hydroxy aliphatic acids, the gelatine being present in an amount to produce a composition solid at normal body temperatures.

17. A process in accordance with claim 16 in which the sugar is dextrose.

18. A process for preparing a therapeutic composition to provide a prolonged therapeutic action in the body which comprises dissolving adenylic acid in water with the aid of an alkali to adjust the pH of the solution to not higher than about 6.5, blending the said solution with an aqueous solution of gelatine and adjusting the pH, if necessary, to within the range from about 5 to 5.5 by addition of an organic acid selected from the group consisting of polycarboxylic aliphatic and hydroxy aliphatic acids, the gelatine being present in an amount to produce a composition solid at normal body temperatures.

EDWARD K. HARVILL.

References Cited in the file of this patent

UNITED STATES PATENTS

| Number | Name | Date |
|---|---|---|
| 2,530,480 | Pitkin | Nov. 21, 1950 |

FOREIGN PATENTS

| Number | Country | Date |
|---|---|---|
| 642,380 | Great Britain | Aug. 30, 1950 |